United States Patent
Ley et al.

(10) Patent No.: US 10,693,968 B2
(45) Date of Patent: Jun. 23, 2020

(54) SECURE BINDING WORKFLOW

(71) Applicant: Pivotal Software, Inc., San Francisco, CA (US)

(72) Inventors: Alexander David Ley, London (GB); Colin Jackson, Brooklyn, NY (US); Eric James Malm, Daly City, CA (US); Stephen C. Levine, Ann Arbor, MI (US); Zachary D. Robinson, San Francisco, CA (US)

(73) Assignee: Pivotal Software, Inc., San Francisco, CA (US)

( * ) Notice: Subject to any disclaimer, the term of this patent is extended or adjusted under 35 U.S.C. 154(b) by 102 days.

(21) Appl. No.: 16/129,517

(22) Filed: Sep. 12, 2018

(65) Prior Publication Data
US 2020/0084281 A1 Mar. 12, 2020

(51) Int. Cl.
*G06F 15/16* (2006.01)
*H04L 29/08* (2006.01)
*H04L 29/06* (2006.01)

(52) U.S. Cl.
CPC ........ *H04L 67/141* (2013.01); *H04L 63/0823* (2013.01); *H04L 67/1097* (2013.01); *H04L 67/16* (2013.01)

(58) Field of Classification Search
CPC ... H04L 67/141; H04L 67/1097; H04L 67/16; H04L 63/0823
See application file for complete search history.

(56) References Cited

U.S. PATENT DOCUMENTS

| 8,468,352 B2 | 6/2013 | Teather et al. |
| 9,288,193 B1 | 3/2016 | Gryb et al. |

(Continued)

FOREIGN PATENT DOCUMENTS

| EP | 3 585 026 A1 * | 8/2018 | ............. H04L 29/06 |
| WO | WO 2018/005879 | 1/2018 | |

OTHER PUBLICATIONS

Strukhoff; "Discussing CredHub for Centralized Credential Management in Cloud Foundry"; Feb 8, 2017; Altoros.com; 4 pages (Year: 2017).*

(Continued)

*Primary Examiner* — Richard G Keehn
(74) *Attorney, Agent, or Firm* — Fish & Richardson P.C.

(57) ABSTRACT

Methods, systems, and computer programs encoded on computer storage media, for binding service credentials to an application. One example system receives a service bind request for an application in a cloud application platform. The service bind request includes a request to bind a service provided by a service host in the cloud application platform. The service bind request specifies (i) an identifier for the service and (ii) a unique identifier for the application. The system receives, from the service host, credentials for the application to access the service. The system provides the credentials to a secure credential hub installed on the cloud application platform. The secure credential hub stores the credentials in association with a credential location identifier. The system grants, to the unique identifier for the application, read access to the credential location identifier. The system stores the credential location identifier as application metadata for the application.

27 Claims, 3 Drawing Sheets

(56) References Cited

U.S. PATENT DOCUMENTS

| | | | |
|---|---|---|---|
| 9,361,011 B1* | 6/2016 | Burns | G06F 3/14 |
| 9,397,990 B1* | 7/2016 | Taly | H04L 63/08 |
| 9,477,517 B2 | 10/2016 | Naveh et al. | |
| 9,825,949 B2 | 11/2017 | Asenjo et al. | |
| 2013/0044832 A1* | 2/2013 | Zheng | G06F 9/544 |
| | | | 375/260 |
| 2013/0097706 A1* | 4/2013 | Titonis | G06N 20/00 |
| | | | 726/24 |
| 2017/0142094 A1* | 5/2017 | Doitch | H04L 63/0807 |
| 2018/0069804 A1 | 3/2018 | Laplanche et al. | |
| 2018/0191718 A1* | 7/2018 | Kuzkin | H04L 63/083 |
| 2018/0198618 A1* | 7/2018 | Park | H04L 63/06 |
| 2019/0089602 A1* | 3/2019 | Bagade | G06F 11/3006 |
| 2019/0156245 A1* | 5/2019 | Jan | G06F 9/45558 |

OTHER PUBLICATIONS

PCT International Search Report and Written Opinion in International Application No. PCT/US2019/050452, dated Feb. 24, 2020, 12 pages.

* cited by examiner

SECURE BINDING WORKFLOW

BACKGROUND

This specification relates to computing platforms.

Computing platforms are services that provide organizations a virtual space in which to develop, deploy, run, and manage their user-provided processes. One example of a computing platform is a cloud application platform that facilitates the development of mobile and web applications. Generally, a cloud application platform includes an application programming interface (API) that provides developers access to the platform. Through the API, developers can upload their application code to the platform, connect to services that the support their applications, and compile and run their applications. The API can also define spaces and user roles for organizations. Spaces are shared locations where applications are developed, deployed, or maintained. User roles define developers' access to those spaces.

Cloud application platforms keep track of application code, application versions, and application instances. They can also provide access to services that simplify the development and management of applications, allowing developers to focus on the logic in their application code. Services are external resources necessary for applications to serve their intended function. Services provide resources such as middleware, databases, message queues, email, and more.

Generally, an application on a cloud application platform accesses a respective service using service credentials, e.g., a username and password of a user account, generated by the respective service. The service credentials can be stored as metadata of the application in a centralized database on the cloud application platform. Storing service credentials as metadata has a few security drawbacks. For example, the service credentials may need to transit opaquely through certain components of the system, potentially exposing services to a broader range of vulnerabilities and exploits than is necessary. In addition, the service credentials may be visible to computing resources that host an application instance.

SUMMARY

This specification describes technologies for securely storing service credentials for services on a cloud application platform. At the direction of a platform controller, and for a particular application on the cloud application platform, a service broker for a particular service sends to the service a provision request and a service bind request. The provision request causes the service to reserve resources for the application. For example, if the service is a database service, the provision request might cause the service to create a new database instance that is reserved for the application. Meanwhile, the service bind request causes the service to provide credentials that allow the application to access the service. The credentials are usually a username and password of a user account that "belongs" to the application.

The service broker receives the credentials from the service but does not store the credentials in the centralized database on the cloud application platform. Instead, the service broker provides the credentials to a secure credential hub installed on the cloud application platform. The secure credential hub stores the credentials in a location identified by a credential location identifier. The secure credential hub provides the credential location identifier to the service broker. The credential storage hub also grants read access to the application for which the bind request was sent based on a unique identifier of the application.

Thereafter, the service broker provides the credential location identifier, but not the actual credentials, to the centralized database of the cloud application platform. The credential location identifier is stored as metadata of the application in the centralized database.

When the cloud application platform launches an instance of the application, the computing resource that hosts the instance generates a certificate that encodes the unique identifier of the application. To access the service, the computing resource provides the certificate and the credential location identifier to the secure credential hub. The secure credential hub verifies that the unique identifier is associated with an application that has read access to the location defined by the credential location identifier and provides the credentials stored at that location to the computing resource. The computing resource then populates the process environment of the launched instance of the application with the credentials. The application can access the service by obtaining the credentials from the process environment.

The subject matter described in this specification can be implemented in particular embodiments so as to realize one or more of the following advantages. By storing the credential location identifier as application metadata rather than the service credentials, i.e., by storing a reference to the service credentials rather than the service credentials themselves, access to those service credentials is restricted. Only applications having unique identifiers that are granted read access to the location in the secure credential hub where the credentials are stored can retrieve the credentials. Other components of the cloud application platform—and developers and entities that use the cloud application platform—cannot access that location. Consequently, service credentials are exposed only to the service that created them, the entity responsible for storing them, and the consuming entity, e.g., the container hosts the application that uses the respective service. This limits the ability of developers and other entities to intentionally or inadvertently view, use, or distribute those credentials.

The use of a service broker also ensures that credentials are not exposed to components of the cloud application platform that do not require those credentials. The service broker facilitates secure communication between the platform controller, the secure credential hub, and the computing resources that host application instances. The service broker facilitates secure communication through the use of Transport Layer Security (TLS) protocol, which provides connection security with mutual authentication, data confidentiality and integrity, key generation and distribution, and security parameter negotiation.

Storing service credentials in a separate component also allows the cloud application platform to decouple the process of changing service credentials from changing application state, which enables service credential rotation without rescheduling application workloads across computing resources.

Finally, from the perspective of an application, nothing is different. When an application instance is launched, the credentials that the application expects to see in the process environment are present.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
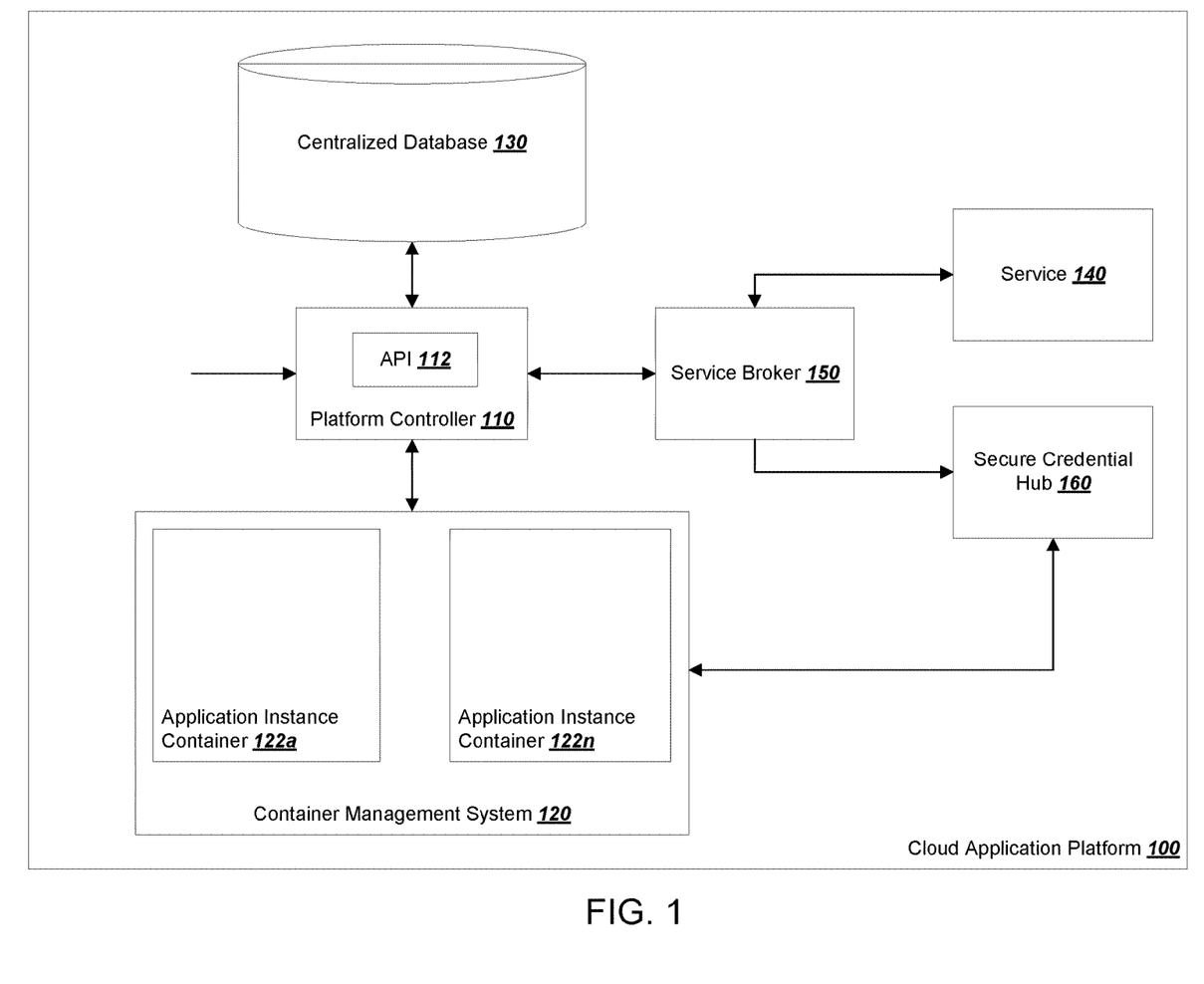
FIG. 1 is a diagram of an example cloud application platform.

FIG. 1 is a diagram of an example cloud application platform 100. The cloud application platform 100 is a computing service that provides organizations a virtual space in which to develop, deploy, run, and manage their mobile and web applications.

The cloud application platform 100 includes a platform controller 110. The platform controller 110 can keep track of application code, application versions, and application instances. The platform controller 110 also includes an API 112 that can provide developers access to the cloud application platform 100. In some implementations, the API 112 is a graphical user interface. In other implementations, the API 112 is a command line interface. Through the API 112, developers can upload their application code to the cloud application platform 100 and compile and run their applications. The API 112 can also allow developers to define spaces and user roles for organizations. Spaces are shared locations where applications are developed, deployed, or maintained. User roles define developers' access to those spaces.

The API 112 can also provide access to services that simplify the development and management of applications, allowing developers to focus on the logic of their application code. Services provide resources such as middleware, databases, message queues, email, and more.

The cloud application platform 100 has a container management system 120 that can control containers in which application instances are hosted. That is, the container management system 120 can create containers in which application instances run and adjusts resource allocation between those containers.

The container management system 120 can host one or more virtual machines, and each virtual machine can host one or more application instance containers 122a-122n. In this specification, containers refer to isolated user-space instances that are implemented by operating-system-level virtualization. Containers share computing resources, e.g., memory or processing power, of their respective computing systems. Computing systems can dynamically adjust resource allocation between containers as necessary.

Containers differ from virtual machines in several respects. First, a container hosted on a particular physical computer can share operating system resources with other containers hosted on the same physical computer. Therefore, it is possible to run multiple containers with only a single operating system. On the other hand, different virtual machines do not share operating system resources. In other words, to run two different virtual machines on the same physical computer, running two full operating systems is typically required.

Second, a computing system can allocate different levels of computing resources to different containers running on the same physical computer. In addition, the allocations can be dynamically changed. In contrast, a virtual machine cannot easily change resource allocations for programs on the virtual machine.

Each instance of the application can run in its own container in one of the virtual machines. This container can isolate processes, memory, and file systems using operating system features and the characteristics of the virtual and physical infrastructure where the cloud application platform 100 is deployed.

The cloud application platform 100 also includes a centralized database 130. The centralized database 130 can store any appropriate application data, e.g., the application code, the application's name, a number of instances specified by a developer, a buildpack for the application if applicable, and information relating to services that support the application.

Developers can use the cloud application platform 100 to deploy and run their applications. First, a developer can provide through the API 112 of the platform controller 110 a directory containing application source code and can use the API 112 to issue a push command. The push command initiates a series of steps that ultimately cause the application to run on the cloud application platform 100, where the application can begin performing tasks, e.g., serving requests from outside users.

In response to receiving the push command, the platform controller 110 can create a record of the application in the centralized database 130. That is, the platform controller 110 writes application metadata, including, for example, the application name, the number of instances the developer specified, and a buildpack for the application, among other information, to the centralized database 130. The platform controller 110 can also write the application files from the specified directory to the centralized database 130 and can create an application package from those application files. Then, the platform controller 110 can issue a staging request to the container management system 120, which schedules a container to run a staging task for the application. The staging task can download the buildpack for the application and can use the buildpack to compile and stage the application.

The virtual machine scheduled to stage the application can stream the output of the staging process to the API 112 so that the developer can troubleshoot application staging problems. The staging task can package the compiled and staged application into an execution unit, which is selected to run in its own container. The staging task can also write data to cache for next time the application is staged.

As mentioned above, applications on the cloud application platform 100 can utilize services. Services facilitate development, deployment, and management of applications. Services simplify the development and management of applications by allowing developers to focus on the logic in their application code as opposed to back-end infrastructure, for example. Although only a single service 140 is depicted in FIG. 1, the cloud application platform 100 can provide access to any number of services. Examples of services include middleware, databases, message queues, and email, to name just a few examples.

The cloud application platform 100 includes one or more service brokers 150 to facilitate secure communication between the platform controller 110, one or more services, and one or more containers that host application instances. In some implementations, the cloud application platform 100 has a single service broker. For example, the cloud application platform 100 of FIG. 1 includes just a single service broker 150 that connects to multiple services. In other implementations, the cloud application platform 100 has multiple service brokers. For example, the cloud application platform 100 can have a separate service broker for each service. For convenience, the cloud application platform 100 will be described as having a single service broker.

In some implementations, the service broker 150 is a separate underlying component of the cloud application platform 100. In other implementations, the service broker 150 is an application that runs on the cloud platform application platform 100.

The service broker 150 can implement an API for which the platform controller 110 is the client. The service broker 150 can advertise a catalog of service offerings and service plans for one or more services. The service broker 150 can also facilitates the transmission of requests from the platform controller 110 to the service. A provision request reserves resources on the service for a particular application instance. The reserved resource is also known as a service instance. A bind request asks the service to provide credentials, e.g., a username and password of a user account, that allow an application instance, or the container in which an application instance is running, to access the reserved resource. And a de-provision request deletes the resource. What a service instance is can vary by service; it can be a single database on a multi-tenant server, a dedicated cluster, or even an account on a web application.

The service broker 150 can establish secure connections with services and with other components of the cloud application platform 100 using any appropriate protocol. For example, the service broker 150 can use the Transport Layer Security (TLS) protocol, which provides connection with mutual authentication, data confidentiality and integrity, key generation and distribution, and security parameter negotiation. Use of the TLS protocol ensures that third-parties cannot access the credentials as they are exchanged between the service and the service broker 150, or between the service broker 150 and other components of the cloud application platform 100.

The framework of the cloud application platform 100 can be used to reduce the components that are exposed to service credentials. To do so, the centralized database 130 on the cloud application platform 100 can store references to service credentials rather than storing the service credentials themselves. The actual service credentials can be stored in a different location with tighter access controls and built-in security protocols. To that end, the cloud application platform 100 also includes a secure credential hub 160 that can store service credentials. In addition to storing service credentials, the secure credential hub 160 can store credential metadata and handle credential generation and versioning.

After the service 140 creates a service instance and creates service credentials for an application, the platform controller 110 can receive a request from a developer or from an application deployment pipeline to apply the service credentials to the application. Generally, such a request is associated with a request to launch the application. In such cases, the platform controller 110 can instruct the container management system 120 to launch the application in a new container as described above.

Then, the container can begin to apply the service credentials to the application. To that end, the container can generate a certificate that encodes a unique identifier of the application. The container can provide to the secure credential hub 160 both the certificate and a reference to the service credentials. The secure credential hub 160 uses (i) the unique identifier encoded in the certificate and (ii) the reference to the service credentials to verify that the application has access to the service credentials. Once the secure credential hub 160 does determine that the application has access to the service credentials, it retrieves the service credentials from the location identified by the reference. The secure credential hub 160 can optionally encrypt the credentials using additional information provided in the certificate.

The container receives from the secure credential hub 160 the credentials for the application to access the service. Thereafter, the container can populate the credentials in the process environment of a running instance of the application. The application can use the credentials to access the service by obtaining the credentials from the process environment.

The process described above for binding service credentials to an application can be performed at one of several stages of the application lifecycle. In some implementations, the buildpack of the application includes code that specifies how to configure the application to communicate with services. In such implementations, the binding process is performed during the initial compilation and staging of the application, and the container in which the application runs populates service credentials in a process environment of the application when the application is launched. In other implementations, the platform controller 110 injects separate code into the container in which the application runs. The separate code can cause the container to populate particular service credentials only when they are needed, i.e., when the staged application requires access to the service. In other implementations, the container can bind some credentials at application launch and some credentials only when the application needs them.

Figure 2:
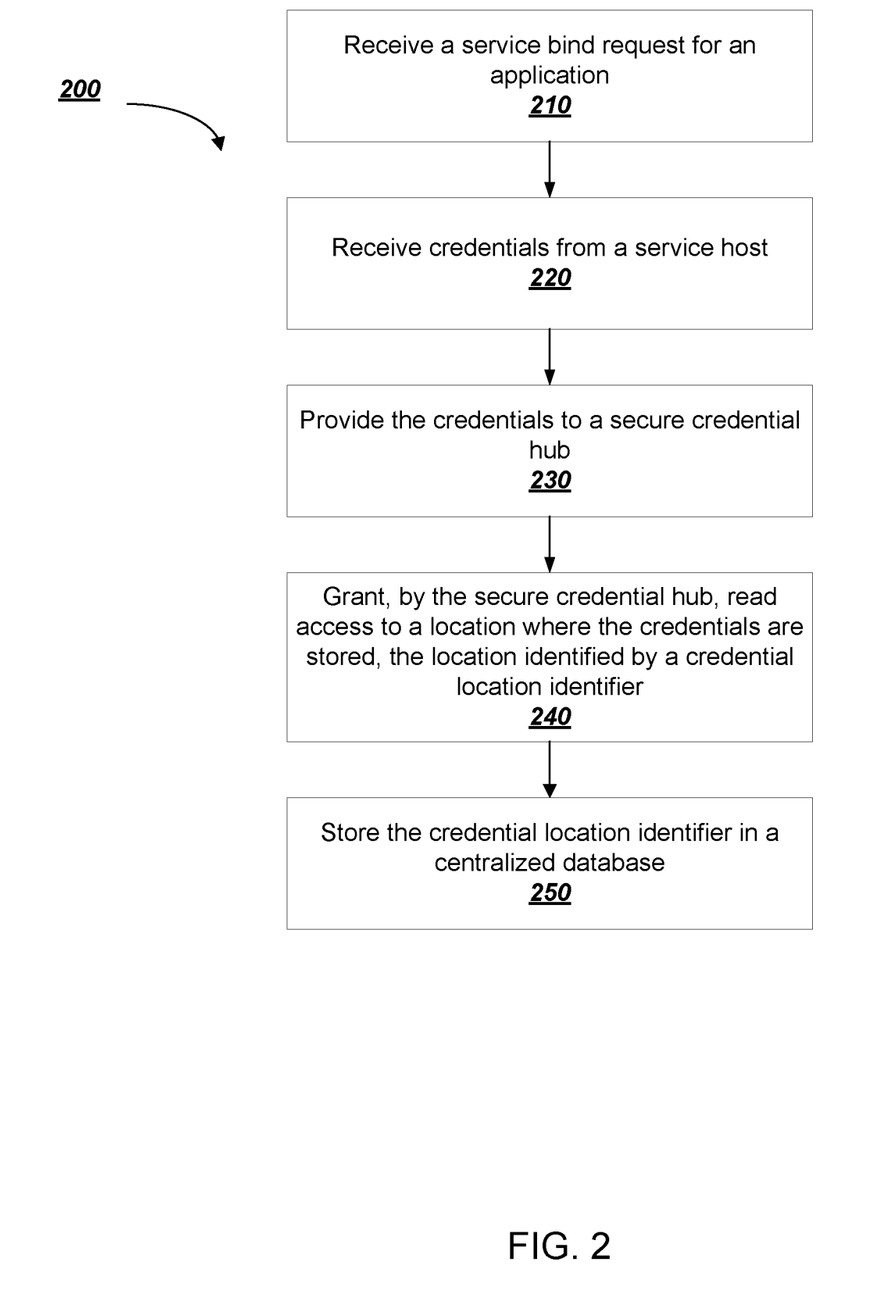
FIG. 2 is a flow chart of an example process for binding a service to an application in a cloud application platform.

FIG. 2 is a flow chart of an example process for binding a service to an application in the cloud application platform. The process can be performed by or at the direction of one or more components of the cloud application platform. For example, the process can be performed by the service broker 150 at the direction of the platform controller 110. For convenience, the process will be described as being performed by a system of one or more computers in one or more locations.

The system receives a service bind request for an application in the cloud application platform (210). Generally, a developer initiates the service bind request using the API of the cloud application platform. The API may provide a list of services and, for each service, a list of plans. Each plan provides a different level of resources at a different cost. The developer can initiate a service bind request by selecting a particular service and a particular plan. For example, the developer can select a 2 GB plan on a storage service.

The service bind request is a request to retrieve credentials, e.g., a username and password of a user account, from a particular service host. The credentials allow the application to access the resources that the service host provides. Continuing with the example above, the credentials would allow the application to access 2 GB of storage space on a server. The service bind request specifies an identifier for the desired service and a unique identifier for the application that will use the service. In some cases, the unique identifier identifies an application that has not yet launched.

In some cases, a provisioning request precedes the service bind request. A provisioning request reserves service resources for the application.

In response to the service bind request, the system receives, from the service host, credentials for the application to access the service (220).

The system provides the credentials to a secure credential hub installed on the cloud application platform (230). In some implementations, the secure credential hub is an application. In other implementations, the secure credential hub is a native component of the cloud application platform.

The secure credential hub stores the credentials in association with a credential location identifier, which represents the location in the secure credential hub where the service credentials are stored. In some implementations, the credential location identifier is a path, e.g., the name of a file or directory in the secure credential hub where the service credentials are stored.

The system also provides to the secure credential hub the unique identifier of the application that will use the credentials to access the service. The secure credential hub grants, to the application having the unique identifier, read access to the location in the secure credential hub identified by the credential location identifier (240). This way, only that application, and not other applications, can access the credentials.

Finally, the system stores the credential location identifier in the centralized database of the cloud application platform as application metadata (250). Because the system does not store the credentials themselves in the centralized database, developers and other applications cannot get access to the service.

Figure 3:
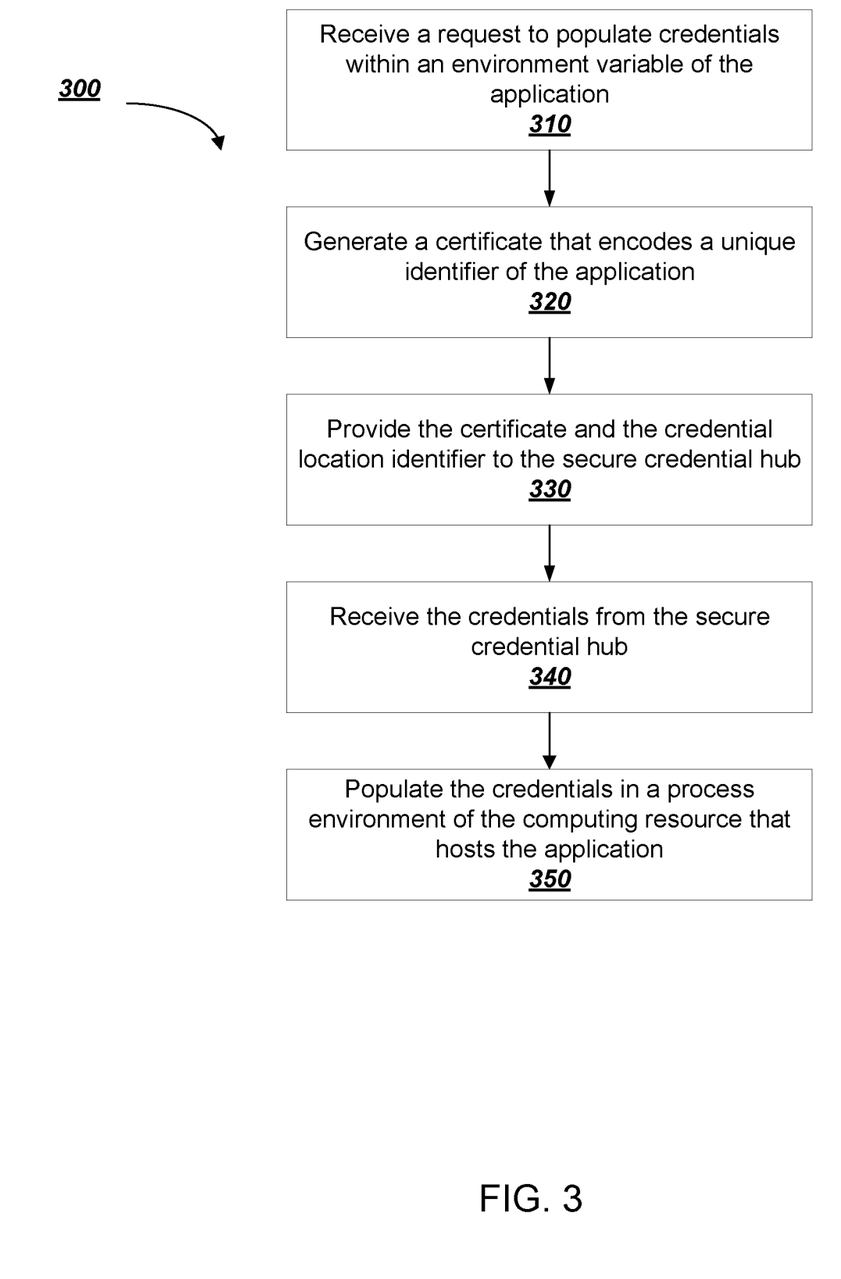
FIG. 3 is a flow chart of an example process for populating a process environment of an application instance with service credentials.

FIG. 3 is a flow chart of an example process for populating service credentials within in an environment of the application so that the application can access the service. The process can be performed by or at the direction of one or more components of the cloud application platform. For example, the process can be performed by the service broker 150 at the direction of the platform controller 110 or at the direction of the computing resource that the hosts the application that needs to user the credentials.

The system receives a request to populate the credentials within an environment variable of the application (310). Generally, the system receives this request from the container management system as the application is being launched. In some cases, the container management system sends the request only when the application needs to access the service.

In response to the request, the computing resource that hosts the application within the cloud application platform, e.g., the virtual machine or container that hosts the application, generates a certificate that encodes the unique identifier of the application (320). In some implementations, the certificate includes a public and private key pair for encrypting messages between the computing resource and the secure credential hub. The messages are generally encrypted according to the TLS protocol. In some implementations, the certificate is signed with an intermediate certificate that is unique to the computing resource, as opposed to a group of computing resources, as is the case for the primary certificate. In some cases, the computing resource that hosts the application can be preconfigured with this intermediate certificate. If each computing resource that hosts an application instance has its own intermediate certificate and private key pair, then the secure credential hub can be more selective in verifying certificates. For example, the secure credential hub can check that the application instance corresponding to the unique identifier actually resides on the computing resource. This would guard against scenarios in which another computing resource's intermediate certificate is disclosed and used to issue arbitrary instance-specific certificates. Similarly, the computing resource can revoke its intermediate certificate selectively if it is known to have been compromised. The effectiveness of the intermediate certificate is greater when it has a short validity period.

The computing resource that hosts the application provides to the secure credential hub (i) the certificate that encodes the unique identifier of the application and (ii) the credential location identifier (330). The computing resource can retrieve the credential location identifier from the centralized database on the cloud application platform where it was initially stored. The credential location identifier defines the location in the secure credential hub where the service credentials are stored. The credential location identifier can be a path, e.g., the name of a file or directory in the secure credential hub. The secure credential hub verifies, using the unique identifier of the application making the request, that the application has read access to the path where the credentials are stored. If the application making the request does have read access, the secure credential hub retrieves the credentials from the path.

The computing resource receives from the secure credential hub the credentials for the application to access the service (340).

Thereafter, the computing resource can populate the credentials in a process environment of a running instance of the application on the computing resource host (350). In some cases, the computing resource populates the credentials when the application is launched. In other cases, the application may not need to use the credentials right away, so the computing resource does not populate the credentials in the process environment until later. The application can then use those credentials to access the service by obtaining the credentials from the process environment. If the credentials are encrypted, the application can decrypt them using the private key that the computing host previously generated.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:

receiving a service bind request for an application in a cloud application platform system, wherein the service bind request comprises a request to bind a service provided by a service host in the cloud application platform system, wherein the service bind request specifies (i) an identifier for the service and (ii) a unique identifier for the application;

receiving, from the service host, credentials for the application to access the service;

providing the credentials to a secure credential hub installed on the cloud application platform system, wherein the secure credential hub stores the credentials in association with a credential location identifier;

granting, to the unique identifier for the application, read access to the credential location identifier; and storing the credential location identifier as application metadata for the application.

Embodiment 2 is the method of embodiment 1, further comprising:

receiving a request to populate the credentials within an environment of the application;

generating, by a computing resource host that hosts the application within the cloud application platform system, a certificate that encodes the unique identifier of the application;

providing, by the computing resource host to the secure credential hub, the certificate that encodes the unique identifier of the application and the credential location identifier; and receiving, by the computing resource host from the secure credential hub, the credentials for the application to access the service.

Embodiment 3 is the method of embodiment 2, further comprising:

populating the credentials within a process environment of a running instance of the application on the computing resource host, wherein the application is configured to access the service by obtaining the credentials from the process environment.

Embodiment 4 is the method of any of embodiments 2-3, wherein the secure credential hub verifies that the application has read access to the location identified by the credential location identifier.

Embodiment 5 is the method of any of embodiments 2-4, wherein generating the certificate includes generating a public and private key pair.

Embodiment 6 is the method of any of embodiments 2-5, wherein generating the certificate includes signing the certificate with an intermediate certificate.

Embodiment 7 is the method of embodiment 6, wherein the computing resource host is preconfigured with the intermediate certificate.

Embodiment 8 is the method of embodiment 3, wherein populating the credentials within a process environment of a running instance of the application on the computing resource host occurs at application launch.

Embodiment 9 is the method of any of embodiments 1-8, wherein storing the credential location identifier as application metadata for the application comprises storing the credential location identifier in a centralized database on the cloud application platform, further comprising:

retrieving, by a computing resource host that hosts the application within the cloud application platform, the credential location identifier from the centralized database.

Embodiment 10 is the method of any of embodiments 1-9, wherein providing the credentials to a secure credential hub comprises:

authenticating with a preconfigured client.

Embodiment 11 is the method of any of embodiments 1-10, wherein the unique identifier is for an application that has not yet launched.

Embodiment 12 is the method of any of embodiments 1-11, wherein the credential location identifier is a path.

Embodiment 13 is the method of any of embodiments 1-12, wherein multiple applications have read access to a same credential location identifier.

Embodiment 14 is a system comprising: one or more computers and one or more storage devices storing instructions that are operable, when executed by the one or more computers, to cause the one or more computers to perform the method of any one of embodiments 1-13.

Embodiment 15 is one or more computer storage media storing instructions that are operable, when executed by one or more computers, to cause the one or more computers to perform the method of any one of embodiments 1-13.

While this specification contains many specific implementation details, these should not be construed as limitations on the scope of any invention or on the scope of what is being or may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising one or more computers and one or more storage devices storing instructions that, when executed by the one or more computers, cause the one or more computers to perform operations comprising:

receiving a service bind request for an application in a cloud application platform system, wherein the service bind request comprises a request to bind a service provided by a service host in the cloud application platform system, wherein the service bind request specifies (i) an identifier for the service and (ii) a unique identifier for the application;

receiving, from the service host, credentials for the application to access the service;

providing the credentials to a secure credential hub installed on the cloud application platform system, wherein the secure credential hub stores the credentials in association with a credential location identifier;

granting, to the unique identifier for the application, read access to the credential location identifier; and storing the credential location identifier as application metadata for the application.

2. The system of claim 1, wherein the operations further comprise:

receiving a request to populate the credentials within an environment of the application;

generating, by a computing resource host that hosts the application within the cloud application platform system, a certificate that encodes the unique identifier of the application;

providing, by the computing resource host to the secure credential hub, the certificate that encodes the unique identifier of the application and the credential location identifier; and receiving, by the computing resource host from the secure credential hub, the credentials for the application to access the service.

3. The system of claim 2, wherein the operations further comprise:

populating the credentials within a process environment of a running instance of the application on the computing resource host, wherein the application is configured to access the service by obtaining the credentials from the process environment.

4. The system of claim 3, wherein populating the credentials within a process environment of a running instance of the application on the computing resource host occurs at application launch.

5. The system of claim 2, wherein the secure credential hub verifies that the application has read access to the location identified by the credential location identifier.

6. The system of claim 2, wherein generating the certificate includes generating a public and private key pair.

7. The system of claim 2, wherein generating the certificate includes signing the certificate with an intermediate certificate.

8. The system of claim 7, wherein the computing resource host is preconfigured with the intermediate certificate.

9. The system of claim 1, wherein storing the credential location identifier as application metadata for the application comprises storing the credential location identifier in a centralized database on the cloud application platform, and wherein the operations further comprise:

retrieving, by a computing resource host that hosts the application within the cloud application platform, the credential location identifier from the centralized database.

10. The system of claim 1, wherein providing the credentials to a secure credential hub comprises:

authenticating with a preconfigured client.

11. The system of claim 1, wherein the unique identifier is for an application that has not yet launched.

12. The system of claim 1, wherein the credential location identifier is a path.

13. The system of claim 1, wherein multiple applications have read access to a same credential location identifier.

14. A method comprising:

receiving a service bind request for an application in a cloud application platform system, wherein the service bind request comprises a request to bind a service provided by a service host in the cloud application platform system, wherein the service bind request specifies (i) an identifier for the service and (ii) a unique identifier for the application;

receiving, from the service host, credentials for the application to access the service;

providing the credentials to a secure credential hub installed on the cloud application platform system, wherein the secure credential hub stores the credentials in association with a credential location identifier;

granting, to the unique identifier for the application, read access to the credential location identifier; and storing the credential location identifier as application metadata for the application.

15. The method of claim 14, further comprising:

receiving a request to populate the credentials within an environment of the application;

generating, by a computing resource host that hosts the application within the cloud application platform system, a certificate that encodes the unique identifier of the application;

providing, by the computing resource host to the secure credential hub, the certificate that encodes the unique identifier of the application and the credential location identifier; and receiving, by the computing resource host from the secure credential hub, the credentials for the application to access the service.

16. The method of claim 15, further comprising:

populating the credentials within a process environment of a running instance of the application on the computing resource host, wherein the application is configured to access the service by obtaining the credentials from the process environment.

17. The method of claim 16, wherein populating the credentials within a process environment of a running instance of the application on the computing resource host occurs at application launch.

18. The method of claim 15, wherein the secure credential hub verifies that the application has read access to the location identified by the credential location identifier.

19. The method of claim 15, wherein generating the certificate includes generating a public and private key pair.

20. The method of claim 15, wherein generating the certificate includes signing the certificate with an intermediate certificate.

21. The method of claim 20, wherein the computing resource host is preconfigured with the intermediate certificate.

22. The method of claim 14, wherein storing the credential location identifier as application metadata for the application comprises storing the credential location identifier in a centralized database on the cloud application platform, further comprising:

retrieving, by a computing resource host that hosts the application within the cloud application platform, the credential location identifier from the centralized database.

23. The method of claim 14, wherein providing the credentials to a secure credential hub comprises:

authenticating with a preconfigured client.

24. The method of claim 14, wherein the unique identifier is for an application that has not yet launched.

25. The method of claim 14, wherein the credential location identifier is a path.

26. The method of claim 14, wherein multiple applications have read access to a same credential location identifier.

27. One or more non-transitory computer storage media storing instructions that are operable, when executed by one or more computers, to cause the one or more computers to perform operations comprising:

receiving a service bind request for an application in a cloud application platform system, wherein the service bind request comprises a request to bind a service provided by a service host in the cloud application platform system, wherein the service bind request specifies (i) an identifier for the service and (ii) a unique identifier for the application;

receiving, from the service host, credentials for the application to access the service;

providing the credentials to a secure credential hub installed on the cloud application platform system, wherein the secure credential hub stores the credentials in association with a credential location identifier;

granting, to the unique identifier for the application, read access to the credential location identifier; and storing the credential location identifier as application metadata for the application.

\* \* \* \* \*